United States Patent
Chang

(10) Patent No.: US 7,591,578 B2
(45) Date of Patent: Sep. 22, 2009

(54) EDGE TYPE BACKLIGHT MODULE HAVING A REFLECTIVE PLATE

(75) Inventor: Shao-Han Chang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/102,841

(22) Filed: Apr. 14, 2008

(65) Prior Publication Data

US 2008/0192507 A1 Aug. 14, 2008

Related U.S. Application Data

(63) Continuation of application No. 11/508,635, filed on Aug. 23, 2006, now abandoned.

(51) Int. Cl.
*F21V 7/04* (2006.01)
(52) U.S. Cl. .................. 362/612; 362/634; 362/633; 362/632; 362/95
(58) Field of Classification Search ................ None
See application file for complete search history.

(56) References Cited

U.S. PATENT DOCUMENTS

| | | | | |
|---|---|---|---|---|
| 4,874,228 A * | 10/1989 | Aho et al. | ...................... | 349/62 |
| 5,054,885 A * | 10/1991 | Melby | .......................... | 359/618 |
| 5,381,309 A * | 1/1995 | Borchardt | ...................... | 362/612 |
| 2004/0032725 A1* | 2/2004 | Hsieh et al. | ................... | 362/31 |
| 2005/0157500 A1* | 7/2005 | Chen et al. | ................... | 362/294 |
| 2006/0104090 A1* | 5/2006 | Lengyel et al. | ............... | 362/612 |

* cited by examiner

*Primary Examiner*—Sandra L O'Shea
*Assistant Examiner*—Danielle Allen
(74) *Attorney, Agent, or Firm*—Frank R. Niranjan

(57) ABSTRACT

An edge type backlight module includes a diffusion plate, at least a lamp-fixing unit, at least a light source and a reflective plate. The lamp-fixing unit is disposed under one edge of the diffusion plate. The lamp-fixing unit includes an inner surface facing the inner area underneath the diffusion plate, an outer surface opposite to the inner surface, and a plurality of fin structures defined on the outer surface. The light source is fixed on the inner surface of the lamp-fixing unit. The reflective plate is disposed adjacent the lamp-fixing unit and under the diffusion plate, facing the light source. Light rays emitted from the light source being uniformly reflected toward the diffusion plate by the reflective plate. The present backlight module has a thin body and also has a good heat dissipation capability.

12 Claims, 9 Drawing Sheets

US 7,591,578 B2

EDGE TYPE BACKLIGHT MODULE HAVING A REFLECTIVE PLATE

CROSS-REFERENCE TO RELATED APPLICATIONS

The present application is a continuation application of application Ser. No. 11/508,635 filed on Aug. 23, 2006, which claims priority from Chinese Patent applications No. 200610033262.3 filed on Jan. 21, 2006, the entire contents of which are incorporated herein by reference for all purposes.

TECHNICAL FIELD

The present invention relates to backlight modules, more particularly, to adge type backlight modules for use in, for example, a liquid crystal display (LCD).

BACKGROUND

Most LCD devices are passive devices in which images are displayed by controlling an amount of light input from an outside light source. Thus, a separate light source (for example, backlight module) is generally employed for illuminating an LCD.

Generally, backlight modules can be classified into an edge type or an edge type based upon the location of lamps within the device. The edge type backlight module has a lamp unit arranged at a side portion of a light guiding plate that guides light. The edge type backlight modules are commonly employed in small-sized LCD due to their lightweight, small size, and low electricity consumption. However, the edge type backlight modules are not suitable for large-sized LCD (20 inches or more). An edge type backlight module has a plurality of lamps arranged in regular positions to directly illuminate an entire surface of an LCD panel. The edge type backlight modules have higher efficiency of light usage and longer operational lifetime than the edge type backlight modules, the edge type backlight modules are especially used in large-sized LCD devices. However, an LCD device usually employs a significant amount of lamps to reach a high luminance. The significant amount of lamps results in a great deal of heat produced and cumulated inside the LCD device. Therefore, heat dissipation of the edge type backlight modules is usually a hard nut to crack.

Referring to FIG. 9, a typical direct type backlight module 100 is shown. The backlight module 100 includes a frame 110, a diffusion plate 120, a heat dissipating plate 130, a reflective plate 140, and a plurality of lamp tubes 150. The frame 110 includes a base 112 and four sidewalls 114 that extend from the peripheral of the base 112, the base 112 and the sidewalls 114 cooperatively define a chamber 116. The heat dissipating plate 130 is disposed on the base 112 of the frame 110. The reflective plate 140 is positioned on the heat dissipating plate 130. The lamp tubes 150 are aligned in the chamber 116 above the reflective plate 140. The diffusion plate 120 is disposed on the frame 110 covering the chamber 116. The reflective plate 140 is used to reflect a part of light rays emitted from the lamp tubes 150 to the diffusion plate 120. The diffusion plate 120 is used to diffuse or reflect light rays by means of shielding, scattering, or refraction.

In order to decrease heat that reduces lifetime of the lamp tubes 150 and causes distortion of the diffusion plate 120 from accumulating in the chamber 116, the bottom surface of the base 112 defines a plurality of fin structures 118 thereon. Heat is efficiently dissipated out from the fin structures 118 via the heat dissipating plate 130. However, the thickness of the backlight module 100 is limited due to the physical properties of the frame 110. In addition, in order to enhance uniformity of light rays for the backlight module 100, there must be a big space between the diffusion plate 120 and the lamp tubes 150 for eliminating potential dark strips caused by the reduced intensity of light between adjacent lamp tubes 150. Therefore, the backlight module 100 suffers from increased thickness and decreased luminance due to exiting between the diffusion plate 120 and lamp tubes 150.

What is needed, therefore, is an edge type backlight module that overcomes the above mentioned shortcomings.

SUMMARY

An edge type backlight module according to a preferred embodiment includes a diffusion plate, a lamp-fixing unit, a light source and a reflective plate. The lamp-fixing unit is disposed under one edge of the diffusion plate. The lamp-fixing unit is a sidewall including an inner surface facing an inner area underneath the diffusion plate, an outer surface opposite to the inner surface, and a plurality of fin structures defined on the outer surface. The light source is fixed on the inner surface of the lamp-fixing unit. The reflective plate is disposed adjacent the lamp-fixing unit and under the diffusion plate, facing the light source. The fin structures are aligned on the outer surface of the lamp-fixing unit from the edge of the diffusion plate to an end of the reflective plate. Light rays emitted from the light source being uniformly reflected towards the diffusion plate by the reflective plate.

Other advantages and novel features will become more apparent from the following detailed description of the preferred embodiments, when taken in conjunction with the accompanying drawings.

BRIEF DESCRIPTION OF THE DRAWINGS

Many aspects of the edge type backlight module can be better understood with reference to the following drawings. The components in the drawings are not necessarily drawn to scale, the emphasis instead being placed upon clearly illustrating the principles of the present direct type backlight module. Moreover, in the drawings, like reference numerals designate corresponding parts throughout the several views.

DETAILED DESCRIPTION OF THE PREFERRED EMBODIMENTS

Reference will now be made to the drawings to describe preferred embodiments of the present back the space light module, in detail.

Figure 1:
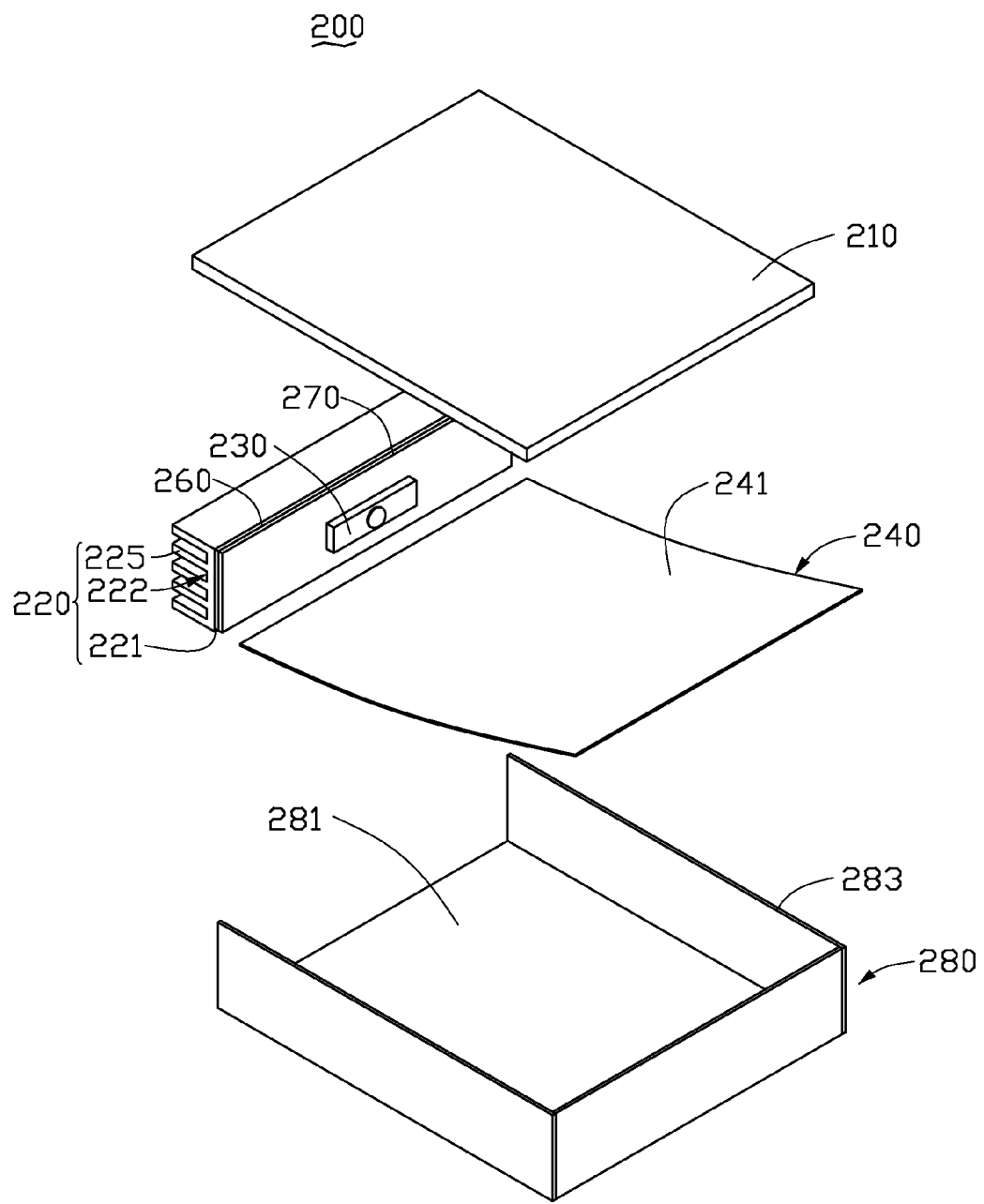
FIG. 1 is a schematic, exploded isometric view of an edge type backlight module according to a first preferred embodiment.
Figure 2:
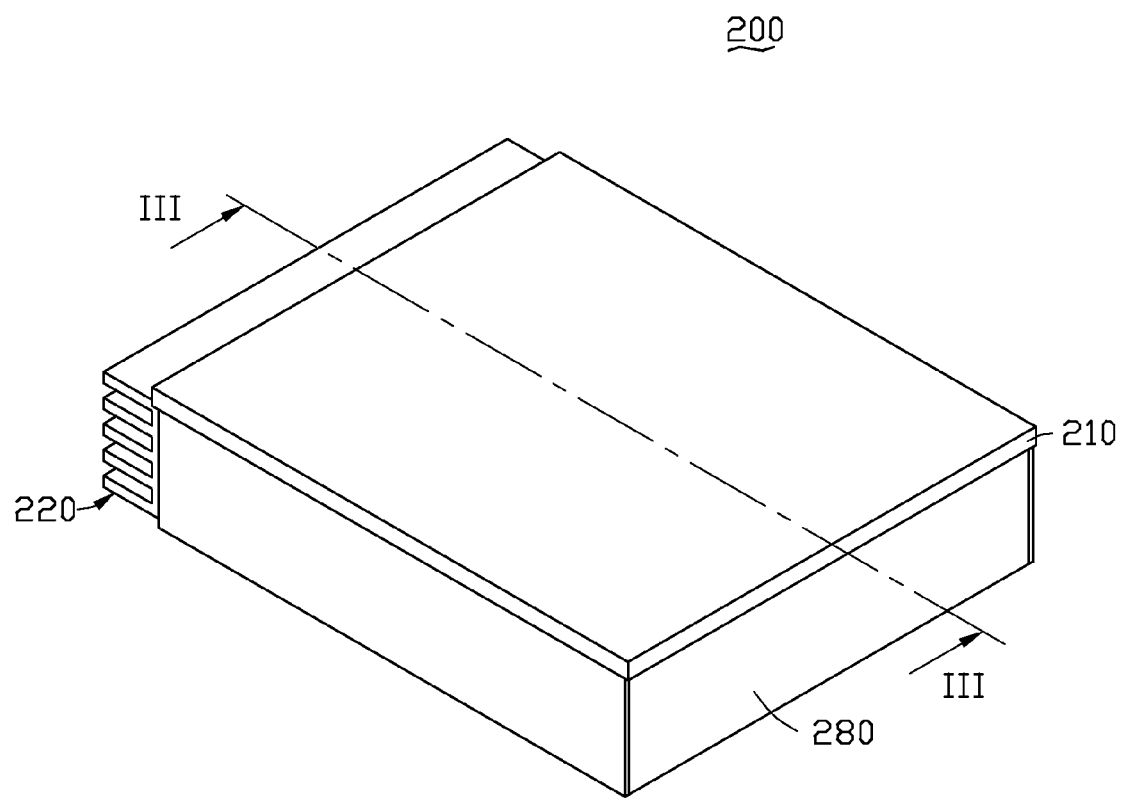
FIG. 2 is a schematic, assembled isometric view of the edge type backlight module of FIG. 1.
Figure 3:
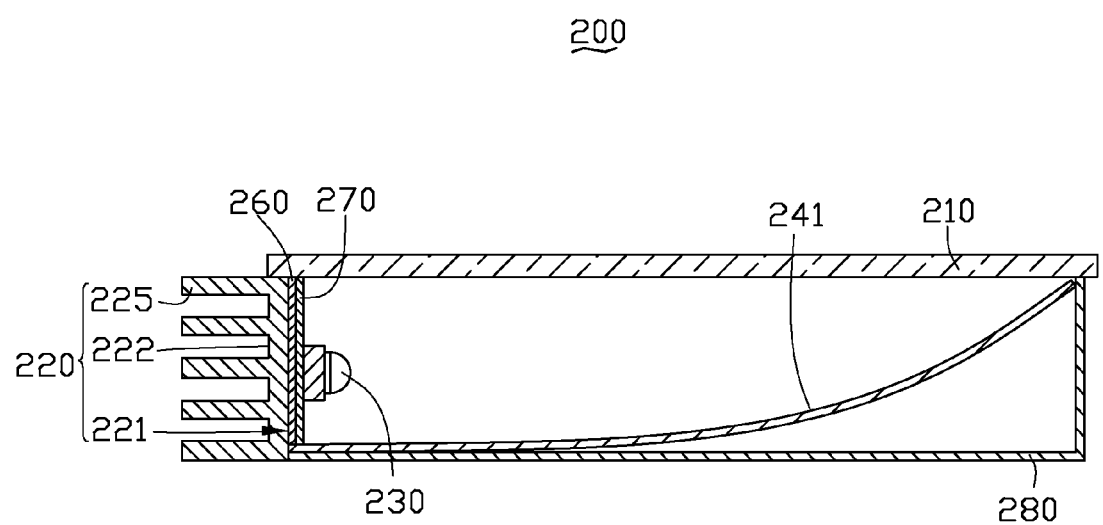
FIG. 3 is a schematic, cross-sectional view taken along a III-III line of FIG. 1.

Referring to FIGS. 1 through 3, an edge type backlight module 200 in accordance with a first preferred embodiment is shown. The backlight module 200 includes a diffusion plate 210, a lamp-fixing unit 220, a light source 230, and a reflective plate 240. The lamp-fixing unit 220 is disposed under one edge of the diffusion plate 210. The lamp-fixing unit 220 includes an inner surface 221 facing an inner area underneath the diffusion plate 210, an outer surface 222 facing an opposite direction from to the inner surface 221, and a plurality of fin structures 225 defined on the outer surface 222 for increasing a heat radiation area and heat transfer efficiency. The light source 230 is fixed on the inner surface 221 of the lamp-fixing unit 220. The reflective plate 240 is disposed adjacent the lamp-fixing unit 220 and under the diffusion plate 210, facing the light source 230.

A longitudinal length of the lamp-fixing unit 220 aligns with an edge of the diffusion plate 210. The lamp-fixing unit 220 may be integrally manufactured. A material of the lamp-fixing unit 220 is selected from a group comprising of aluminum, magnesium, copper or their alloys, or other suitable materials having a good heat dissipation coefficient. In the illustrated embodiment, a material of the lamp-fixing unit 220 is aluminum. The light source 230 is light emitting diode (LED). The reflective plate 240 is a smooth curved sheet bent towards the diffusion plate 210 and the light source 230, the reflective plate 240 further has a reflective surface 241 facing the diffusion plate 210 and the light source 230. It is to be understood that the present backlight module may include a plurality of light sources for improving optical brightness.

Referring also to FIGS. 1 and 2, in order to improve heat dissipation capability of the backlight module 200, the lamp-fixing unit 220 further includes a first heat conductive layer 260 and an aluminum based printed circuit board 270 (PCB), sandwiched between the light source 230 and the inner surface 221 of the lamp-fixing unit 220. It is to be understood that the lamp-fixing unit 220 further includes a second heat conductive layer (not shown) sandwiched between the aluminum base PCB 270 and the light source 230.

Referring also to FIG. 1, the backlight module 200 further includes a frame 280 used for receiving the reflective plate 240 and also for supporting the diffusion plate 210. The frame 280 includes a rectangular base 281 according to the diffusion plate 210, and three sidewalls 283 extending perpendicularly from three edges excluding the edge aligned with the lamp-fixing unit 220 of the base 281. The light source 230 fixed on the lamp-fixing unit 220 faces an inner area of the frame 280. The diffusion plate 210 is positioned on a top of the sidewalls 283. A height of the sidewalls 283 is same as that of the lamp-fixing unit 220. The frame 280 can also help to increase light energy utilization rate by substantially containing light rays in a confined area (not labeled) defined by the lamp-fixing unit 220 and the frame 280.

In use, light rays from the light source 230 can be uniformly reflected onto the diffusion plate 210 by the reflective plate 240. Heat produced by the light source 230 can be efficiently dissipated out from the fin structures 225 via the first heat conductive layer 260 and the aluminum based PCB 270. In addition, because the lamp-fixing unit 220 with the light source 230 is positioned under one edge of the diffusion plate 210, most light rays from the light source 230 avoids projecting directly into the diffusion plate 210, thereby the present backlight module can be configured to be a thin body.

Figure 4:
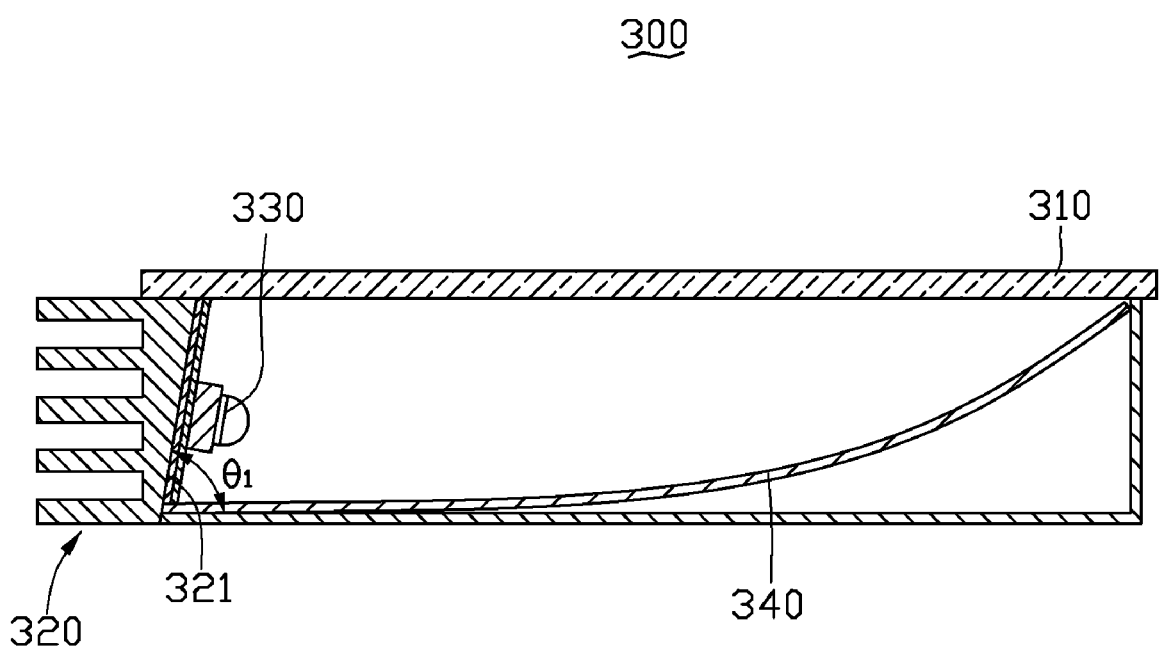
FIG. 4 is a schematic, cross-sectional view of an edge type backlight module according to a second preferred embodiment.

Referring to FIG. 4, a backlight module 300 in accordance with a second preferred embodiment is shown. The backlight module 300 is similar in principle to that of the first embodiment, except that an inner surface 321 of a lamp-fixing unit 320 is slanted inwards forming an inclined acute angle $\theta_1$ defined by the inner surface 321 of the lamp-fixing unit 320 with respect to a reflective plate 340. The inclined acute angle $\theta_1$ is chosen to be about 60 degrees. A curvature of the reflective plate 340 is chosen based upon a positioning of light source 330, thereby reflecting light rays emitted from a light source 330 uniformly into a diffusion plate 310.

Figure 5:
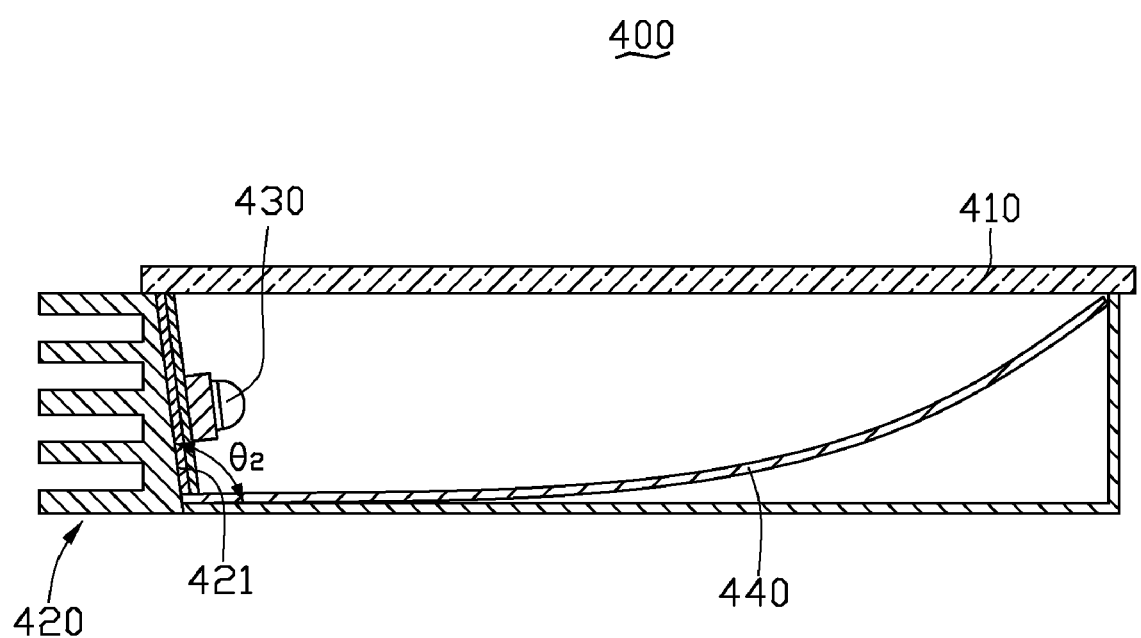
FIG. 5 is a schematic, cross-sectional view of an edge type backlight module according to a third preferred embodiment.

Referring to FIG. 5, a backlight module 400 in accordance with a third preferred embodiment is shown. The backlight module 400 is similar in principle to that of the first embodiment, except that an inner surface 421 of a lamp-fixing unit 420 is slanted outwards forming an inclined obtuse angle $\theta_2$ defined by the inner surface 421 of a lamp-fixing unit 420 with respect to the reflective plate 440. The obtuse angle $\theta_2$ is chosen to be about 120 degrees. A curvature of the reflective plate 440 is chosen based upon a positioning of a light source 430, thereby reflecting light rays emitted from the light source 430 uniformly into a diffusion plate 410.

It is noted that, the angle of inclination of the inner surface with respect to the horizontal portion of the reflective plate is not limited to the above illustrated embodiments. An angle in the range from above about 30 degrees to about 150 degrees should be considered to be within the scope of the present invention.

Figure 6:
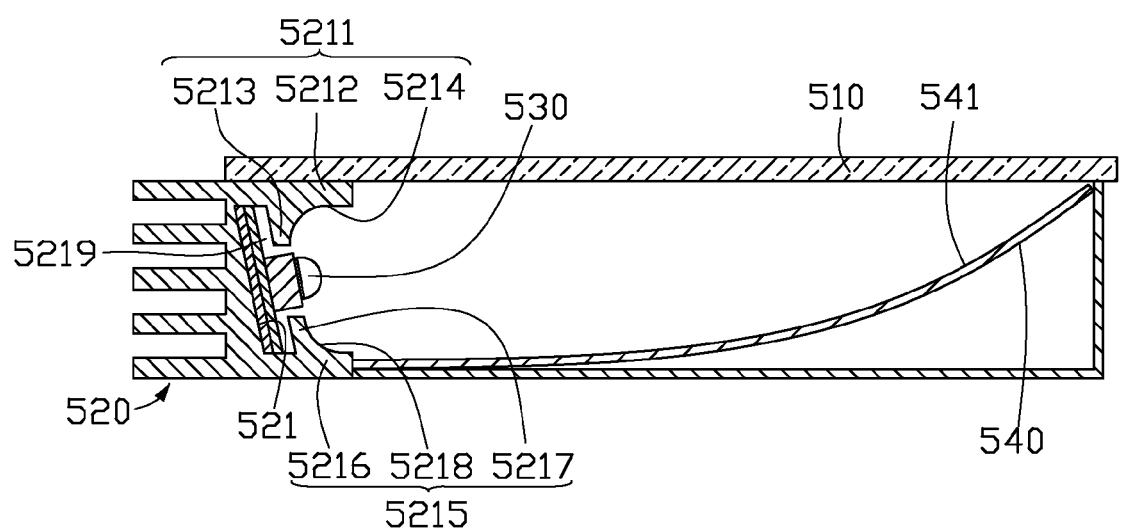
FIG. 6 is a schematic, cross-sectional view of an edge type backlight module according to a fourth preferred embodiment.

Referring to FIG. 6, a backlight module 500 in accordance with a fourth preferred embodiment is shown. The backlight module 500 is similar in principle to that of the third embodiment, except that a lamp-fixing unit 520 of the backlight module 500 further includes an upper reflective portion 5211 and a bottom reflective portion 5215. The upper reflective portion 5211 includes a first protruding wall 5212 extending from a top of an inner surface 521 of the lamp-fixing unit 520 along a direction parallel to the diffusion plate 510 towards an inner area of the diffusion plate 510, a second protruding wall 5213 extending from a bottom surface of the first protruding wall 5212 toward the reflective plate 540 adjacent to the inner surface 521, the first protruding wall 5212 and the second protruding wall 5213 cooperatively defining a second reflective surface 5214 facing the reflective plate 540.

The bottom reflective unit 5215 includes a third protruding wall 5216 extending from a bottom of an inner surface 521 of the lamp-fixing unit 520 along a direction parallel to a diffusion plate 510 toward an inner area of the diffusion plate 510, a fourth protruding wall 5217 extending from an upper surface of the third protruding wall 5216 toward the diffusion plate 510 adjacent to the inner surface 521, the third protruding wall 5216 and the fourth protruding wall 5217 cooperatively defining a third reflective surface 5218 facing the diffusion plate 510. The inner surface 521, the second protruding wall 5213, and the fourth protruding wall 5216 cooperatively define a chamber 5219 to receive a light source 530.

Projectile paths of light rays from the light source 530 can be reflected by the second reflective surface 5214 and the third reflective surface 5218, the reflective surface 541 of the reflective plate 540, before finally projecting into the diffusion plate 510. It is to be understood that curvatures of the second reflective surface 5214, the third reflective surface 5218, and the reflective surface 541 of the reflective plate 540 may all be adjusted, so as to attain a preferred optical performance.

Figure 7:
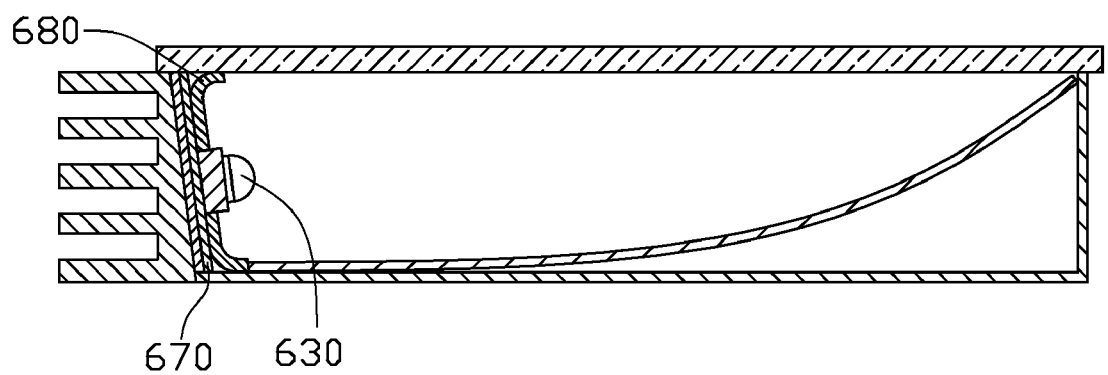
FIG. 7 is a schematic, cross-sectional view of an edge type backlight module according to a fifth preferred embodiment.

Referring to FIG. 7, a backlight module 600 in accordance with a fifth preferred embodiment is shown. The backlight module 600 is similar in principle to that of the third embodiment, except that the backlight module 600 further includes a reflector 680 defining a through hole (not labeled) conformed to a light source 630 therein. The reflector 680 is disposed on an inner surface of an aluminum based PCB 670, the light source 630 being exposed through the through hole thereof. It is to be understood that the reflector 680 may be directly connected with the inner surface of the lamp-fixing unit of the present backlight module.

Figure 8:
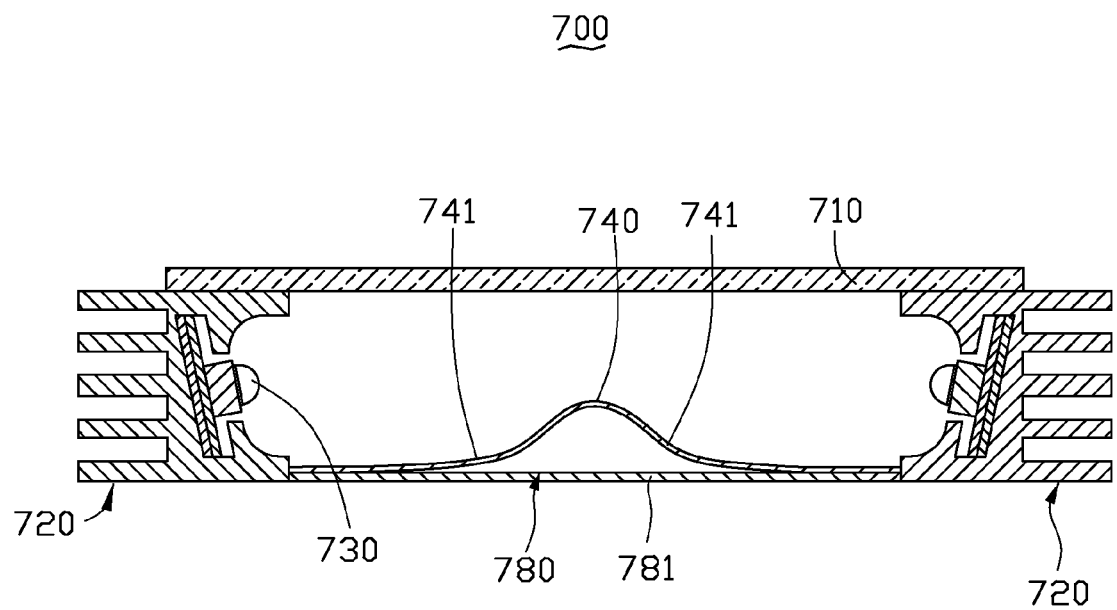
FIG. 8 is a schematic, cross-sectional view of an edge type backlight module according to a sixth preferred embodiment.
Figure 9:
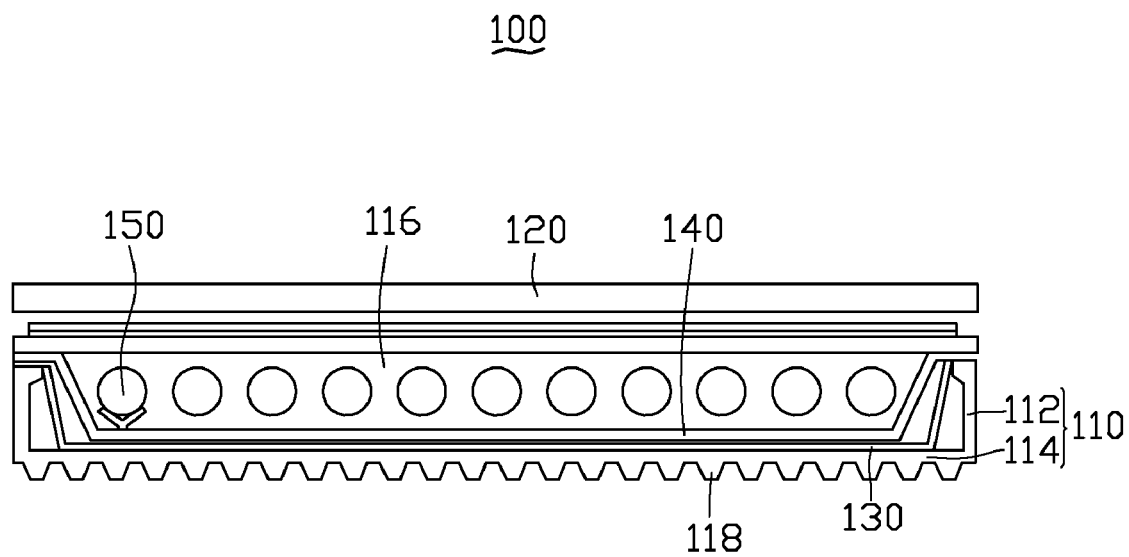
FIG. 9 is a schematic, cross-sectional view of a conventional direct type backlight module.

Referring to FIG. 8, a backlight module 700 in accordance with a sixth preferred embodiment is shown. The backlight module 700 includes a diffusion plate 710, two lamp-fixing units 720, a plurality of light sources 730, a reflective plate 740, and a frame 780. The lamp-fixing units 720 are same as the lamp-fixing unit 520 of the preferred fourth embodiment. The light sources 730 are fixed on an inner surface of the lamp-fixing units 720 correspondingly. The frame 780 is same as the frame 280 of the first preferred embodiment, except that the frame 780 has only two sidewalls (not shown) extending from two opposing edges not aligned with the lamp-fixing units 720 of a base 781. Each lamp-fixing units 720 is aligned on either opposing edge that does not have a sidewall extending from the base 781, further connecting with the two sidewalls. The reflective plate 740 is a curved plate having a crest (not labeled) that has two opposing reflective surfaces 741. The reflective plate 740 is disposed on the base 781 with the two opposing reflective surfaces 741 facing the light sources 730 and the two lamp-fixing units 720. The diffusion plate 710 is positioned on the two lamp-fixing units 720. The reflective plate 740 can reflect light rays from the light sources 730 to the diffusion plate 710 uniformly.

It is to be understood that the light sources of the present direct type backlight module can also be cold cathode fluorescent lamps.

Finally, while the present invention has been described with reference to particular embodiments, the description is illustrative of the invention and is not to be construed as limiting the invention. Therefore, various modifications can be made to the embodiments by those skilled in the art without departing from the true spirit and scope of the invention as defined by the appended claims.

What is claimed is:

1. An edge type backlight module comprising:
a diffusion plate;
at least one lamp-fixing unit disposed under one edge of the diffusion plate, wherein the at least one lamp-fixing unit is a sidewall having an inner surface facing an inner area underneath the diffusion plate, an outer surface opposite to the inner surface, and a plurality of fin structures defined on the outer surface;
at least one light source fixed on the inner surface of the at least one lamp-fixing unit; and
a reflective plate disposed adjacent the lamp-fixing unit and under the diffusion plate, wherein the reflective plate is a curved sheet bending toward the diffusion plate and the at least one light source; the fin structures are aligned on the outer surface of the lamp-fixing unit from the edge of the diffusion plate to an end of the reflective plate, and light rays emitted from the at least one light source are uniformly reflected toward the diffusion plate by the reflective plate,
wherein the at least one lamp-fixing unit further comprises an upper reflective portion, the upper reflective portion having a first protruding wall extending substantially perpendicularly from a top of the inner surface of the at least one lamp-fixing unit towards an inner area of the diffusion plate and a second protruding wall extending from an interior portion of the first protruding wall towards a bottom portion of the inner surface of the at least one lamp-fixing unit, the second protruding wall having a first side surface facing the inner surface of the at least one lamp-fixing unit, and a second side surface facing away from the first side surface; the second side surface and the first protruding wall cooperatively forming a second curved reflective surface facing the reflective plate.

2. The edge type backlight module according to claim 1, wherein the inner surface of the at least one lamp-fixing unit is slanted with respect to a horizontal portion of a reflective plate.

3. The edge type backlight module according to claim 2, wherein an inclination angle defined by the inner surface of the at least one lamp-fixing unit with respect to the horizontal portion of the reflective plate is chosen to be in a range from about 30 degrees to about 150 degrees.

4. The edge type backlight module according to claim 1, wherein the at least one lamp-fixing unit further comprises a bottom reflective portion, the bottom reflective unit includes a third protruding wall extending from a bottom of an inner surface of the at least one lamp-fixing unit along a direction parallel to the diffusion plate toward an inner area of the diffusion plate, a fourth protruding wall extending from an interior portion of an upper surface of the third protruding wall toward the diffusion plate, the fourth protruding wall having a third side surface facing the inner surface of the at least one lamp-fixing unit that fixes the at least one light source thereon, and a fourth side surface facing away from the third side surface; the fourth side surface and the third protruding wall cooperatively forming a third curved reflective surface facing the reflective plate.

5. The edge type backlight module according to claim 1, further comprising a first heat conductive layer, sandwiched between the at least one light source and the inner surface of the at least one lamp-fixing unit.

6. The edge type backlight module according to claim 5, further comprising an aluminum based printed circuit board sandwiched between the at least one light source and the first heat conductive layer.

7. The edge type backlight module according to claim 6, further comprising a second heat conductive layer sandwiched between the aluminum base printed circuit board and the at least one light source.

8. The edge type backlight module according to claim 1, further comprising a reflector defining a through hole conformed to the at least one light source therein, the reflector being disposed on the inner surface of the at least one lamp-fixing unit and the at least one light source being exposed through the through hole thereof.

9. The edge type backlight module according to claim 1, further comprising a frame, the frame having a rectangular base according to the diffusion plate, and three sidewalls extending perpendicularly from three edges excluding the edge aligned with the at least one lamp-fixing unit of the base, the diffusion plate being positioned on a top of the sidewalls.

10. The edge type backlight module according to claim 1, wherein a material of the at least one lamp-fixing unit is selected from a group consisting of aluminum, magnesium, copper, and their alloys.

11. The edge type backlight module according to claim 1, wherein the light source is selected from a group consisting of light emitting diode and cold cathode fluorescent lamp.

12. An edge type backlight module comprising:

a diffusion plate;

two lamp-fixing units disposed under two opposite edges of the diffusion plate, each of the two lamp-fixing units having an inner surface facing an inner area underneath the diffusion plate, an outer surface opposite to the inner surface, and a plurality of fin structures defined on the outer surface;

at least one light source fixed on the inner surfaces of the two lamp-fixing units respectively;

a reflective plate disposed between the two lamp-fixing units and under the diffusion plate, light rays emitted from the at least one light source being uniformly reflected toward the diffusion plate by the reflective plate, wherein the reflective plate is a curved plate having a crest that has two opposing reflective surfaces; and a frame having a rectangular base according to the diffusion plate, and only two sidewalls extending perpendicularly from two opposing edges thereof and not aligned with the two lamp-fixing units of the base, the reflective plate being disposed on the base with the two opposing reflective surfaces thereof facing the at least one light source and the two lamp-fixing units, wherein each lamp-fixing unit further comprises an upper reflective portion, the upper reflective portion having a first protruding wall extending substantially perpendicularly from a top of the inner surface of the lamp-fixing units towards an inner area of the diffusion plate and a second protruding wall extending from an interior portion of the first protruding wall towards a bottom portion of the inner surface of the lamp-fixing unit, the second protruding wall having a first side surface facing the inner surface of the lamp-fixing unit, and a second side surface facing away from the first side surface; the second side surface and the first protruding wall cooperatively forming a second curved reflective surface facing the reflective plate.

* * * * *